(12) United States Patent
Kennedy

(10) Patent No.: US 8,419,887 B2
(45) Date of Patent: *Apr. 16, 2013

(54) COMPOSITE STRUCTURAL MEMBER AND METHOD FOR PRODUCING THE SAME

(75) Inventor: Dennis K. Kennedy, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,870

(22) Filed: Apr. 16, 2012

(65) Prior Publication Data

US 2012/0199271 A1 Aug. 9, 2012

Related U.S. Application Data

(62) Division of application No. 11/562,605, filed on Nov. 22, 2006, now Pat. No. 8,157,469.

(51) Int. Cl.
*F16B 7/00* (2006.01)

(52) U.S. Cl.
USPC ........... 156/294; 156/158; 156/293; 403/274; 403/278; 403/279; 403/280; 403/281; 403/282; 403/285; 403/286; 403/293; 403/298; 403/308; 403/309; 403/310; 403/311; 403/312; 403/313; 403/314; 403/315; 464/179; 464/180; 464/181; 464/182; 464/183

(58) Field of Classification Search .................. 156/158, 156/293, 294; 403/293, 274, 278–282, 285–286, 403/298, 308–315; 464/179–183
See application file for complete search history.

(56) References Cited

U.S. PATENT DOCUMENTS

| | | | |
|---|---|---|---|
| 2,741,498 A | 4/1956 | Elliott | |
| 3,881,973 A | 5/1975 | Pinckney | |
| 4,236,386 A | 12/1980 | Yates et al. | |
| 4,238,540 A | 12/1980 | Yates et al. | |
| 4,260,332 A | 4/1981 | Weingart et al. | |
| 4,358,284 A | 11/1982 | Federmann et al. | |
| 4,704,918 A | 11/1987 | Orkin et al. | |
| 4,851,065 A | 7/1989 | Curtz | |
| 5,613,794 A | 3/1997 | Isaac et al. | |
| 6,379,763 B1 | 4/2002 | Fillman | |
| 7,452,156 B2 | 11/2008 | Kennedy | |

FOREIGN PATENT DOCUMENTS

| | | |
|---|---|---|
| FR | 2 309 453 | 11/1976 |
| FR | 2 356 048 | 1/1978 |
| FR | 2 371 598 | 6/1978 |
| GB | 1 356 393 A | 6/1974 |
| GB | 2 008 720 A | 6/1979 |

*Primary Examiner* — Jeff Aftergut
*Assistant Examiner* — Jaeyun Lee
(74) *Attorney, Agent, or Firm* — Alston & Bird LLP

(57) ABSTRACT

A composite structural member is provided. The structural member includes a tubular shaft having a mating region of stiffness, and possibly thickness, greater than another region of said shaft. The shaft defines a lumen, and a fitting is disposed in the lumen. The fitting has a coupling region that defines at least one recessed portion bounded by one or more non-recessed portions, and the mating region mates with the coupling region of said fitting. As such, the shaft and fitting are mechanically restrained from at least some relative movement due to interference of the shaft and the fitting. A sleeve may be coupled to said shaft, for example, by including a tubular inner surface that proximately surrounds at least part of said shaft and mating region, for discouraging expansion of the mating region of said shaft.

21 Claims, 9 Drawing Sheets

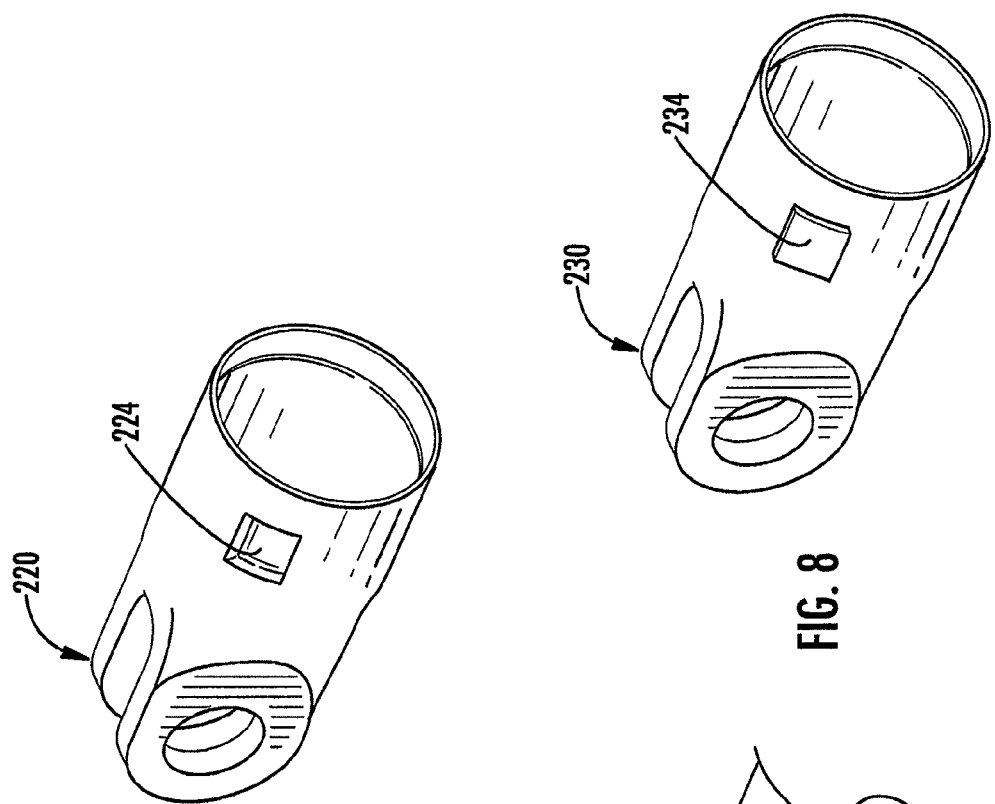
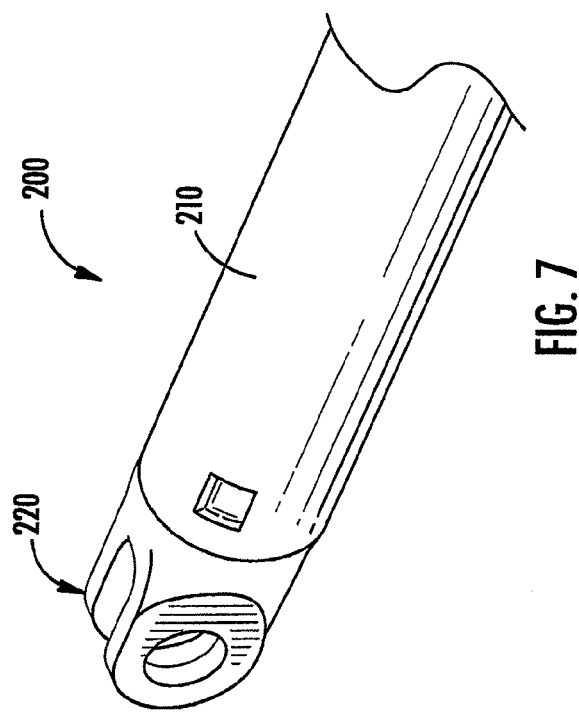

COMPOSITE STRUCTURAL MEMBER AND METHOD FOR PRODUCING THE SAME

CROSS REFERENCE TO RELATED APPLICATION

This application is a divisional of U.S. application Ser. No. 11/562,605, filed Nov. 22, 2006, which is now issued U.S. Pat. No. 8,157,469, on Apr. 17, 2012 the entire contents of which are hereby incorporated by reference.

FIELD

Embodiments of the invention are directed to composite structural members and methods for making the same, and more particularly to composite structural members including parts that interfere with one another.

BACKGROUND

Traditionally, commercial airplanes were constructed with structural components composed mainly of aluminum. Such structural components exhibited significant strength and resistance to degradation at elevated temperatures, and were therefore desirable. In more recent times, commercial airplanes in increasing numbers are being designed and constructed so as to incorporate composite structural components, meaning these components incorporate elements of metal and elements composed of other materials. One of the most common classes of non-metallic material to be used in aircraft construction is polymer-based materials. These materials are relatively lightweight and easily (and, therefore, inexpensively) formed into complex geometries, and as such, designers are using those materials in increasing amounts. This becomes increasingly evident as new reinforcement methods for resin-based, including new reinforcement schemes in fiber-reinforced resin materials, are developed, thereby increasing the strength of the overall composite material. Still, some components are required to withstand large forces or temperatures, and for these, aluminum or another metal is usually preferred.

More recently, the aerospace industry has begun to utilize components that contain both metallic and resin-based elements assembled into one integrated part. This practice utilizes the advantageous features of both classes of materials by combining targeted use of metal elements in strength-critical areas with supplemental use of structurally efficient resin-based materials in other areas. However, the integration of metallic and resin parts involves several challenges. One of the most prominent is maintaining the integrity of the bond between the metal and resin parts. In many cases, such composite parts are bonded using an adhesive, such as epoxy. Residual stresses present in joints between the metal and resin parts, due to the large mismatch of thermal expansion coefficients that often exists between metals and resins, can be great enough to cause de-bonding of the metal and resin elements. Further, the areas where different parts are fastened together often include stress concentrations that can lead to failure. Finally, the adhesive strength between the epoxy and the adjacent parts, as well as the cohesive strength of the epoxy itself, can be reduced when compared to the strength of the component parts. For all of these reasons, failure of composite structural members due to failure of the joints between the metal and resin-based components is a significant issue, and there is a need in the art for an improved method for creating composite structural components in which the integrity of the coupling between the elements of the composite structural component is enhanced.

SUMMARY

Embodiments of the present invention may address at least some of the above issues while potentially providing still other advantages by providing composite structural members and methods for making the same. The composite structural members include parts that interfere with one another, thereby discouraging at least some relative movements between the parts.

One aspect of the present invention is directed to a composite structural member. The structural member includes a tubular shaft having a mating region of stiffness, and possibly thickness, greater than another region of said shaft. The shaft defines a lumen, and a fitting is disposed in the lumen. The fitting has a coupling region that defines at least one recessed portion bounded by one or more non-recessed portions, and the mating region mates with the coupling region of said fitting. As such, the shaft and fitting are mechanically restrained from at least some relative movement due to interference of the shaft and the fitting. Adhesive may be disposed between the coupling region of said fitting and the mating region of said shaft. A sleeve may be coupled to said shaft, for example, by positioning a tubular inner surface of the sleeve so as to proximately surround at least part of said shaft and mating region, for discouraging expansion of the mating region of said shaft. The shaft and fitting and the tubular inner surface of said sleeve may be tapered, and/or adhesive may be disposed between the shaft and sleeve. The fitting can include a shoulder that contacts the sleeve while the inner surface of the sleeve remains substantially parallel with an outer surface of the shaft.

In one embodiment, the recessed portion extends circumferentially around the fitting to form a neck. In another embodiment, the structural member further includes a core disposed in at least part of the lumen of the shaft. In yet another embodiment, the shaft is composed at least partially of fiber reinforced material and the mating region includes an increased amount of fibers oriented substantially circumferentially relative to another region of the shaft.

Another aspect of the present invention is directed to another composite structural member. The structural member includes a fitting having a coupling region. The coupling region defines at least one of a protrusion or a recessed portion bounded by one or more non-recessed portions. A tubular shaft is also included, the shaft having a mating region and defining a lumen. The shaft is composed at least partially of material including reinforcing fibers, and is configured to have more substantially circumferential fibers in the mating region than in another region of the shaft. The fitting is disposed in the lumen of the shaft such that the mating region of the shaft mates with the coupling region of the fitting and the shaft and fitting are mechanically restrained from at least some relative movement due to interference of the shaft and the fitting.

Yet another aspect of the present invention is directed to a method for producing a composite structural member. The method includes providing a fitting that has a coupling region with an outer surface defining at least one recessed portion bounded by one or more non-recessed portions. A shaft is formed around the fitting, for example, by resin transfer molding or laying up of one or more sheets, such that a mating region of the shaft is radially adjacent to the coupling region and mating with the recessed portion or the outer surface. Material is then added to the mating region, in some embodiments such that fibers in the material are preferentially oriented substantially circumferentially with respect to an axis defined by the shaft.

BRIEF DESCRIPTION OF THE DRAWINGS

Figure 1:
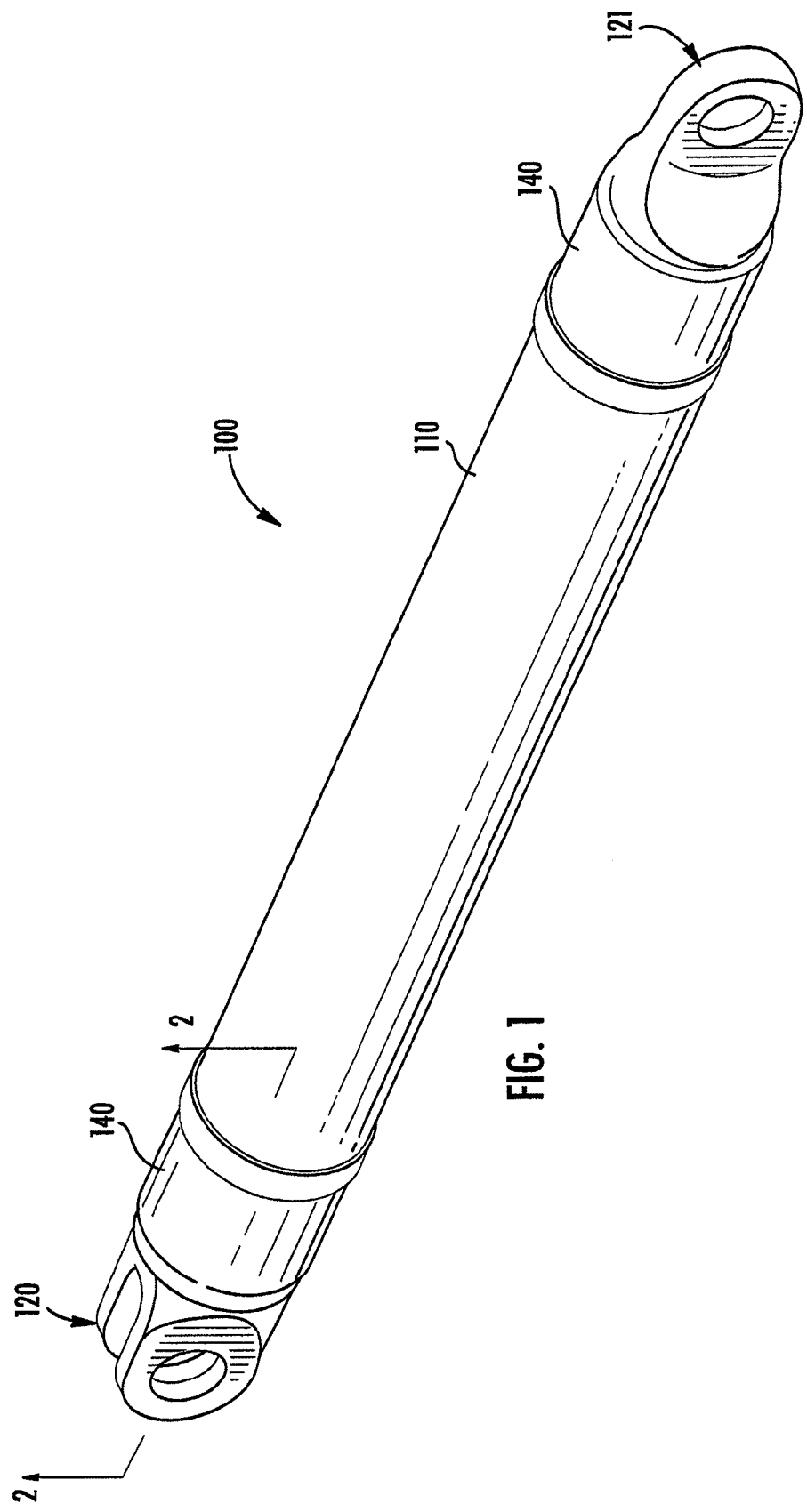
Figure 2:
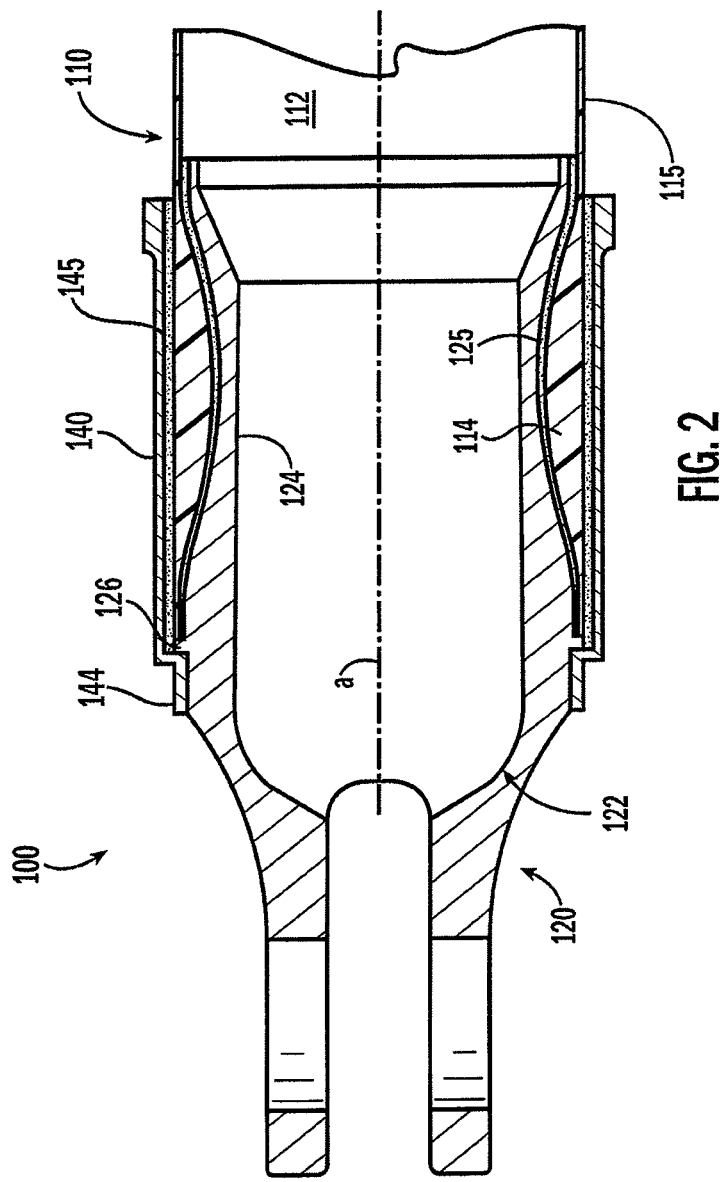
Figure 4:
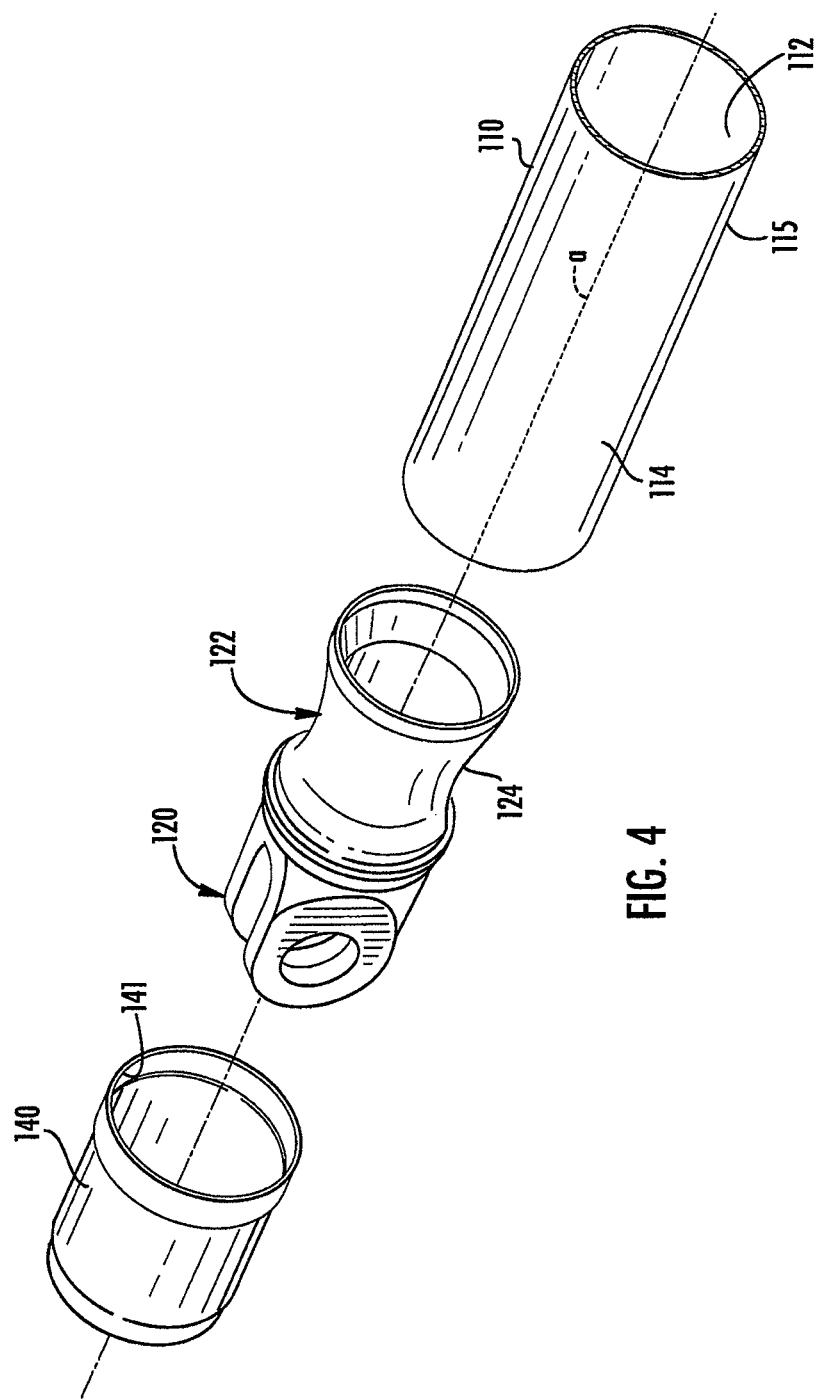
Figure 5A:
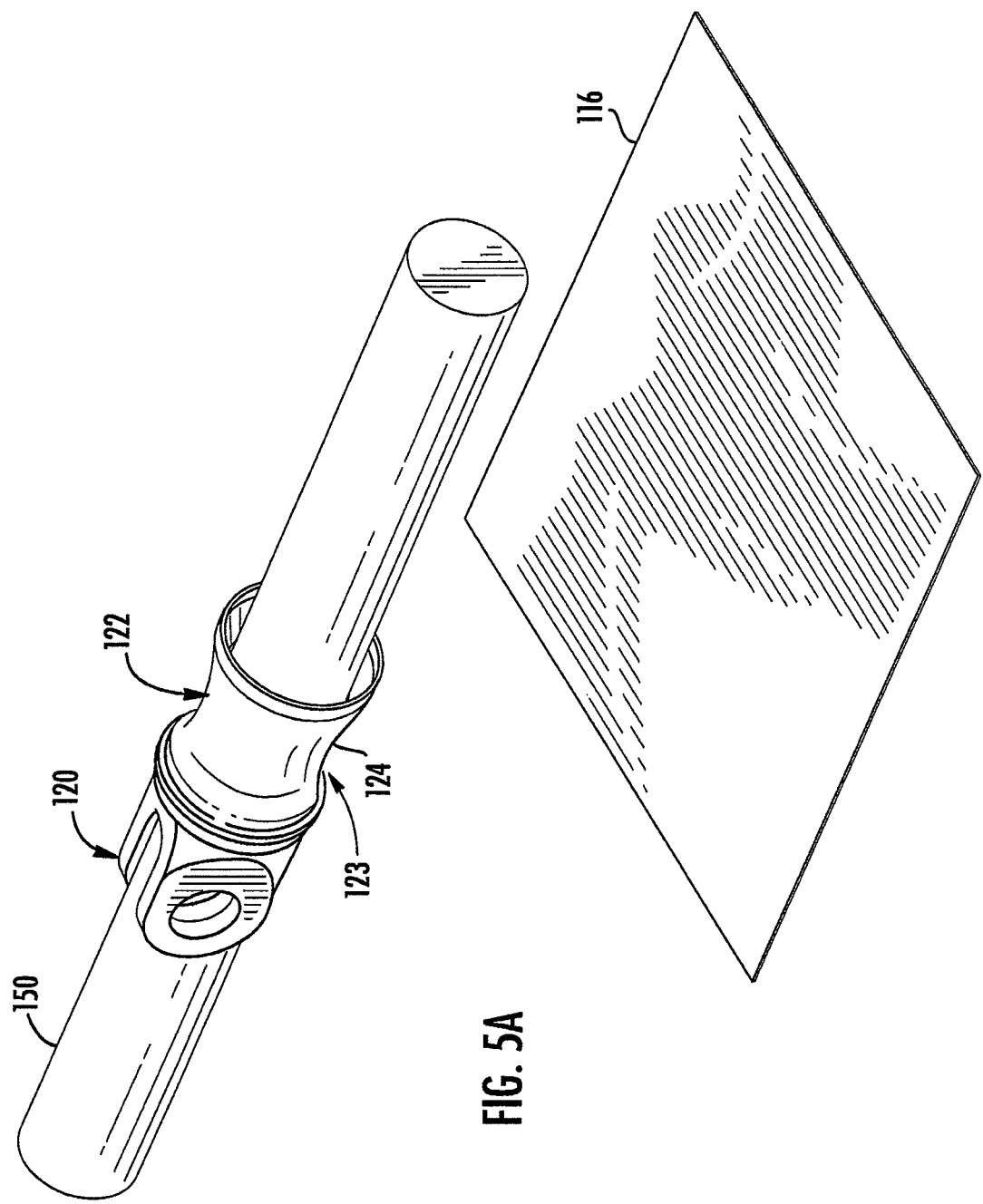
Figure 5B:
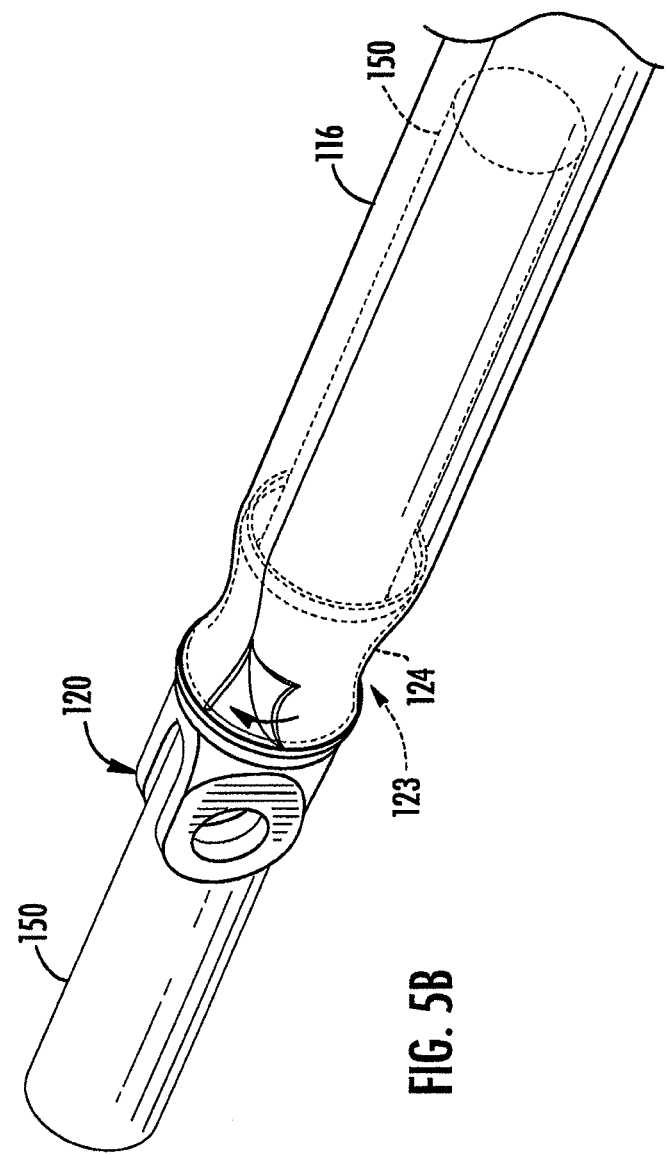
Figure 5C:
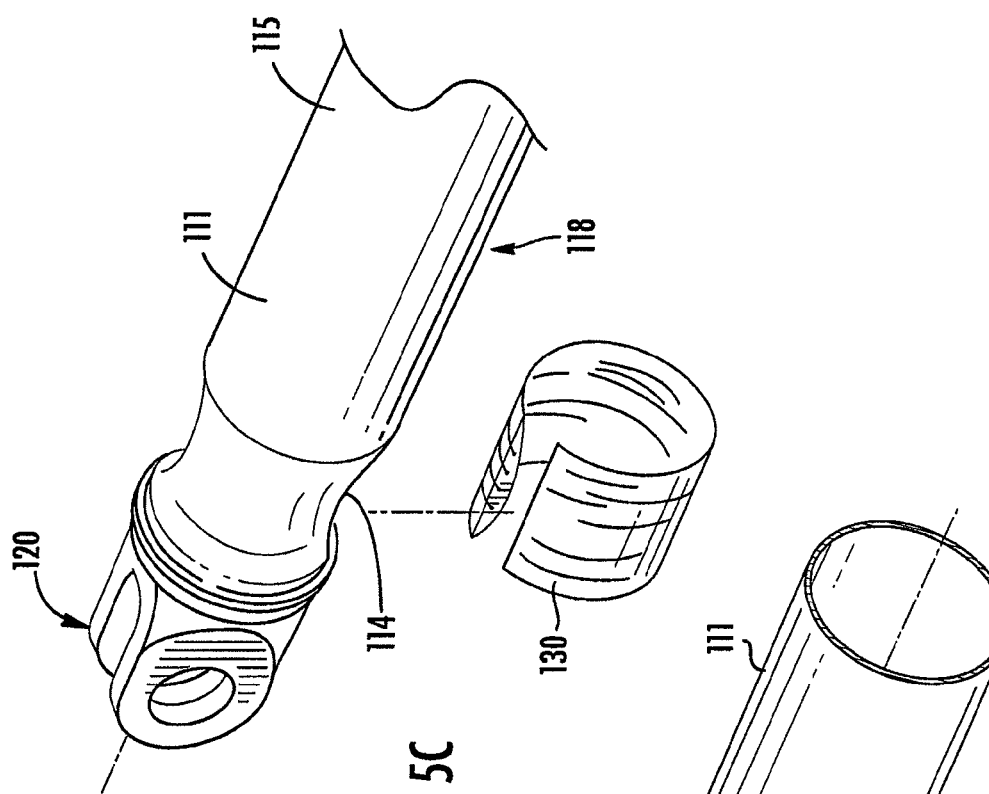
Figure 5D:
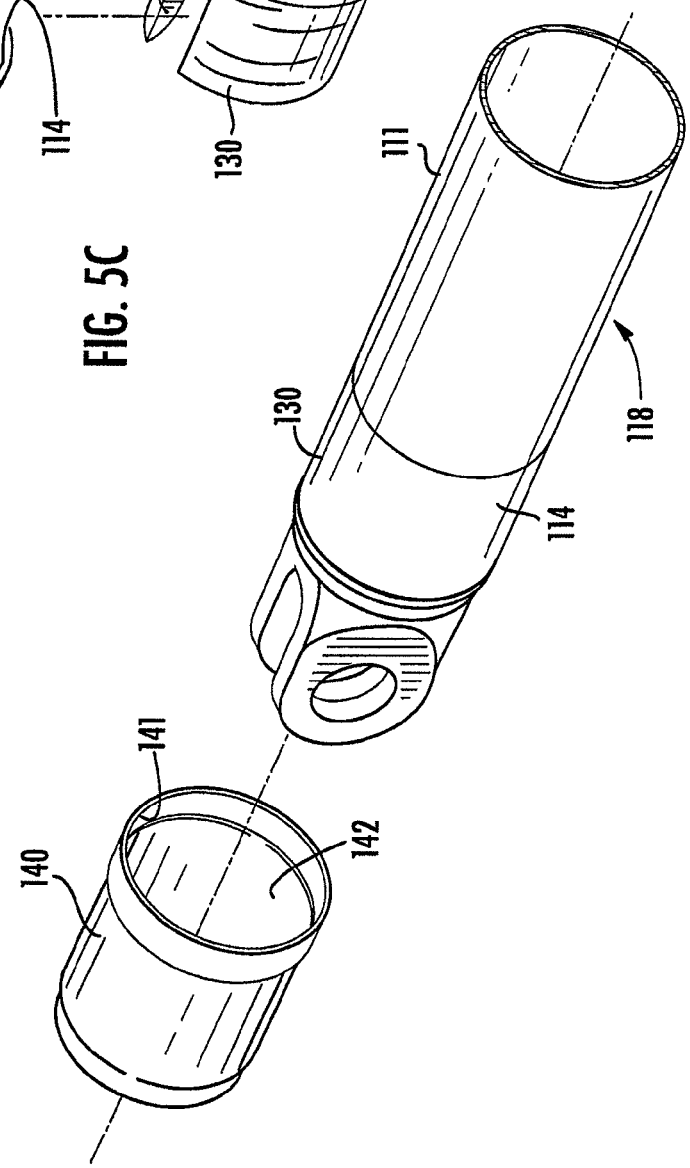
Figure 9:
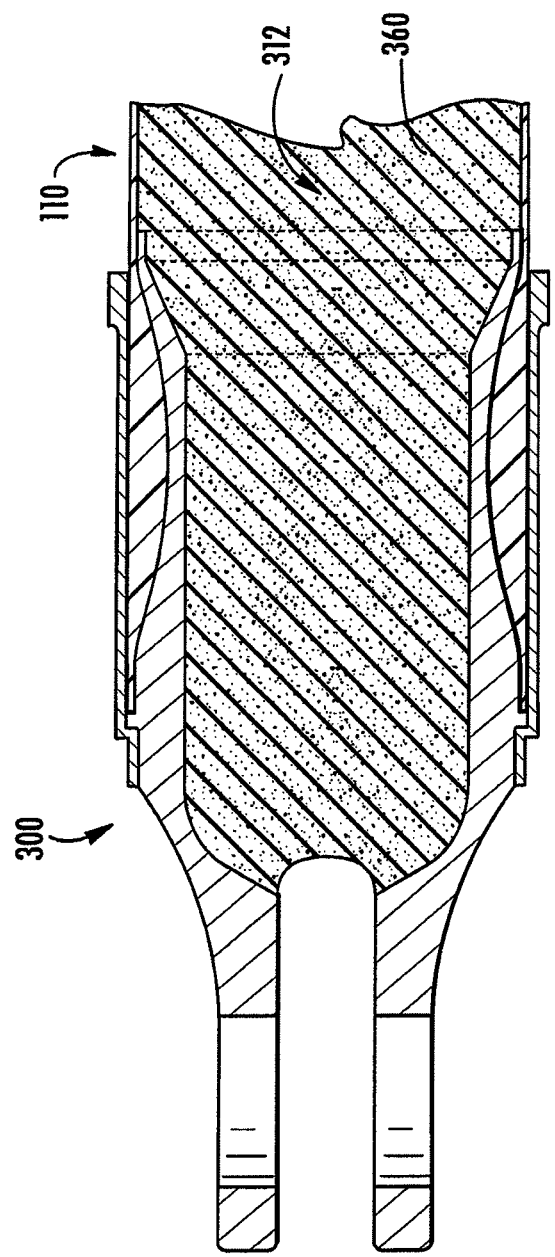

Having thus described the invention in general terms, reference will now be made to the accompanying drawings, which are not necessarily drawn to scale, and wherein:

FIG. 1 is a perspective view of a composite structural member constructed in accordance with an embodiment of the present invention;

FIG. 2 is a cross-sectional view taken along line 2-2 of FIG. 1, showing the internal structure of the composite structural member of FIG. 1;

FIG. 3a is a perspective view in partial cross-section of the shaft and fitting of the composite structural member of FIG. 1;

FIG. 3b is an exploded perspective view, in partial cross-section, of the composite structural member of FIG. 1;

FIG. 4 is an exploded perspective view of the composite structural member of FIG. 1;

FIGS. 5a-d are perspective views, at various sequential stages of assembly according to an embodiment of the present invention, of the composite structural member of FIG. 1;

FIG. 6 is a perspective view of a fitting for a composite structural member constructed in accordance with another embodiment of the present invention, the fitting including a depression;

FIG. 7 is a perspective view of a composite structural member incorporating the fitting of FIG. 6;

FIG. 8 is a perspective view of a fitting for a composite structural member constructed in accordance with another embodiment of the present invention, the fitting including a projection; and FIG. 9 is a cross-sectional view of a composite structural member constructed in accordance with yet another embodiment of the present invention, in which a core is disposed in the lumen of the shaft.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, therein is shown a composite structural member 100 constructed in accordance with an embodiment of the present invention. The composite structural member 100 includes a tubular shaft 110 coupled to end fittings 120, 121. The end fittings are configured to accept a pin, although many other types of end fittings would also be compatible with other embodiments of the present invention. The composite structural member may also include sleeves 140 that are substantially concentric with and surround parts of shaft 110 and end fittings 120, 121, as described further below. Although the shaft, end fittings, and sleeves are all shown to be cylindrical, these components could have other cross sectional shapes.

Figure 3:
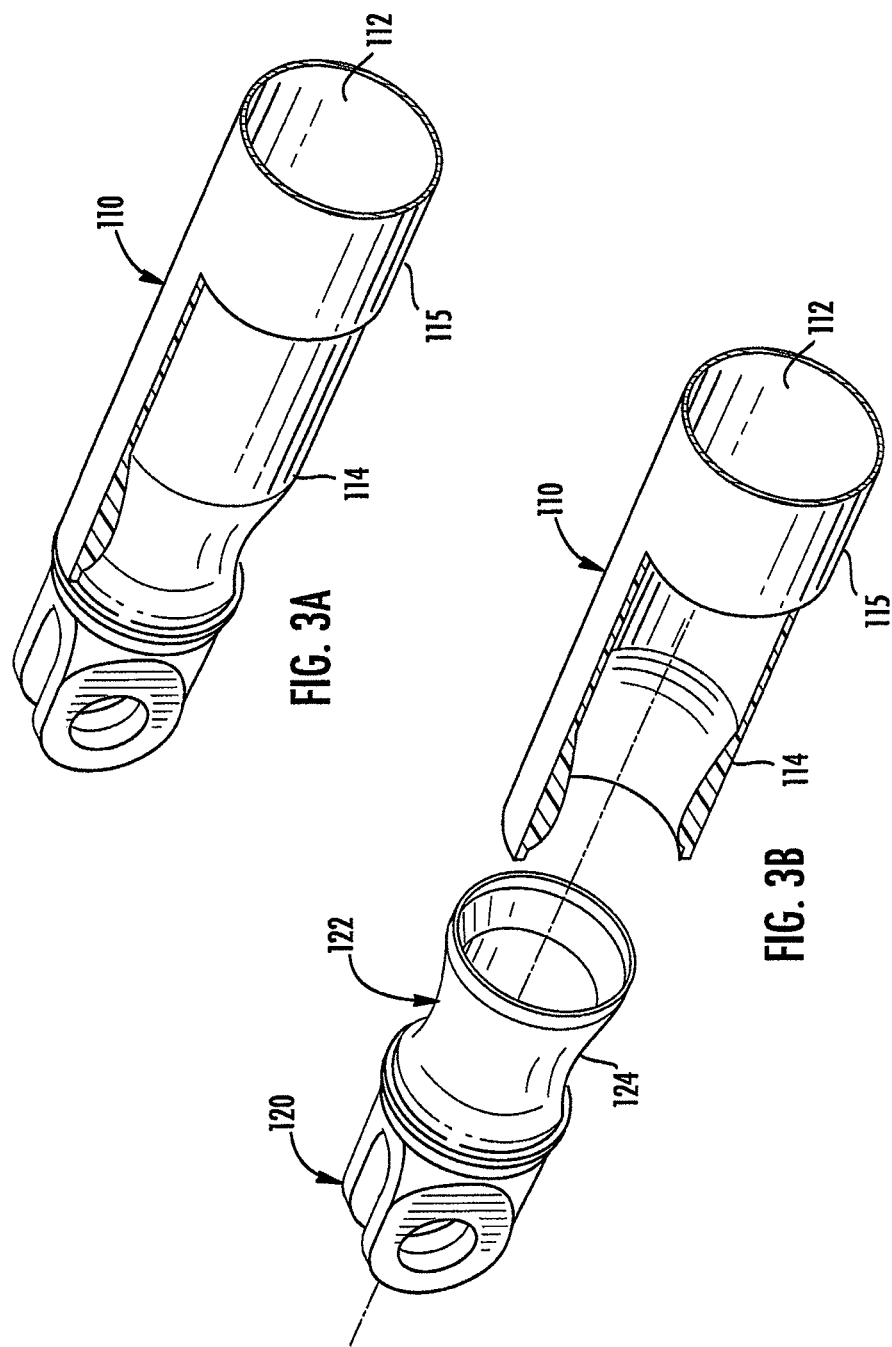

Referring to FIGS. 2-4, fitting 120 includes a coupling region 122 that extends into a lumen 112 defined by shaft 110. Coupling region 122 defines a recessed portion in the form of a neck 124, and shaft 110 includes a mating region 114 with an internal profile similar to that of neck 124. As mentioned, the neck 124 may be circular in cross section, this shape possibly facilitating the manufacturing process, or the neck 124 may be some other shape, such as a polygonal shape, that aids in discouraging relative rotation of the assembled shaft 110 and fitting 120. Mating region 114 is in close radial proximity to coupling region 122 such that mating region 114 mates with coupling region 122, this mating serving to mechanically restrain relative movement of shaft 110 and fitting 120. Specifically, mechanical interference between shaft 110 and fitting 120 discourage relative movement along an axis a defined by shaft 110. In some embodiments, adhesive is disposed between shaft 110 and fitting 120. This adherence serves to further discourage relative movement along the axis defined by the shaft 110, and also to discourage or prevent relative rotation of shaft 110 and fitting 120.

Mating region 114 generally has a stiffness, and often a strength, greater than a non-mating portion 115 of the shaft, for example, due to an increased thickness of shaft 110 in the mating region 114 as compared to the non-mating region 115. Stiffness of the mating region 114 can be increased in ways other than or in addition to increased thickness. For example, a stiffer material can be used to form the mating region as opposed to that used to form the non-mating region. As another example, the material forming the mating region could be preferentially reinforced when compared to the material forming the non-mating portion. For example, if the material forming the shaft is fiber-reinforced resin, more fibers could be included and/or oriented to increase the stiffness of the mating region as compared to the non-mating region. In some embodiments, the shaft can be constructed to have anisotropic stiffness, such that the stiffness of the mating region is increased for radial expansions of the shaft, but not for axial elongation of the shaft. For example, shaft 110 can be comprised of fiber reinforced material and the mating region 114 can include an increased amount of fibers oriented substantially circumferentially relative to non-mating region 115.

In this way, the increased stiffness of mating region 114 inhibits radial expansion of the mating region 114 of shaft 110 upon loading of the composite structural member 100. Such a radial expansion could lead to separation of shaft 110 and fitting 120. The sleeve 140 has a tubular inner surface 141 that proximately surrounds at least part of mating region 114, and in some embodiments, part of the non-mating region 115 as well, further discouraging separation of shaft 110 and fitting 120. In one embodiment, sleeve 140 is compressed around shaft 110, thereby increasing the amount of contact between sleeve 140 and shaft 110 as well as enhancing the mechanical coupling of those two components. In another embodiment, adhesive is disposed between shaft 110 and sleeve 140 in order to secure sleeve 140. In yet another embodiment, the coupling between shaft 110 and fitting 120 may be sufficiently strong relative to the loading conditions of the member 100 to obviate the need for a sleeve.

Referring to FIGS. 5a-d, therein is shown one method for producing the composite structural member 100 (FIG. 1). A fitting 120 is provided, the fitting having a coupling region 122 with an outer surface 123 that defines a neck 124 in the manner discussed previously. The fitting is typically metallic, such as of aluminum, but may be formed of other materials including combinations of materials. A mandrel 150 is extended through an opening in fitting 120, and one or more sheets 116 of uncured polymer-based material or dry fibers for resin injection are laid up around fitting 120 and mandrel 150 to form shaft 111. Sheet 116 is configured such that it overlaps with neck 124 as it is being laid up around fitting 120. During lay up, fitting 120 and mandrel 150 provide support for sheet 116, which is typically quite flexible due to the small thickness of the sheet and the fact that the sheet 116 is uncured. Consequentially, shaft 111 formed of sheet 116 generally assumes a shape defined by the outer surfaces of fitting 120 and mandrel 150. Specifically, shaft 111 includes a mating region 114 that closely follows the contour of neck 124. Once sheet 116 is laid up to form shaft 111, sheet 116 is cured to increase rigidity of the shaft 111 and to cause shaft 111 to adhere to fitting 120. After cure, a mating region 114 of shaft 111 is radially adjacent to the coupling region 122 of the fitting 120 and mating with the neck 124. After cure, the mandrel 150 may be removed from the composite structural member.

Once shaft 111 has been formed around fitting 120, additional mating region material 130 may be placed onto the mating region 114 of shaft 111. Additional mating region material 130 is applied to mating region 114 so that the material 130 sits in the recess defined by neck. Material 130 may be applied partially or completely around shaft 111. Once material 130 is applied, the assembly is cured to increase rigidity of the additional material 130 and, therefore, the shaft 111, as well as to cause material 130 to adhere to shaft 111. As such, radial expansion or deformation of shaft 111 is largely prevented, as is any consequential axial separation of shaft 111 and fitting 120. In some embodiments, the portion of the shaft 111 disposed within the recess, including the additional material 130, serves to effectively fill the recess so that the outer surfaces of the mating region 114 and non-mating region 115 are substantially flush, while in other embodiments, more or less material is applied in the mating region. When the material comprising the shaft and the material applied in the mating region are similar, curing the assembly can lead to the integration of the two materials into a single, continuous mating region.

Additional material 130 can be the same material as in sheet 116 or can be a different material. In one embodiment, both the sheet 116 and additional material 130 are comprised of fiber-reinforced resin, although either one may separately be comprised of such material. The fiber-reinforced resin of the sheet 116 and additional material 130 can be anisotropic based on the orientations of the fibers, and may be applied such that fibers in the additional material 130 are preferentially oriented circumferentially so as to increase the resistance of the additional material to radial expansion. Additional material 130 may be applied so that fibers of the fiber-reinforced resin extend substantially completely around shaft 111, potentially providing more resistance to radial expansion of mating region 114. Preferential orientation in this case refers to the fact that a significant number of fibers tend to be oriented generally circumferentially, although not all of the fibers necessarily need to be so oriented. Additional material, whether of the same or different composition as the previously-applied material, can be applied in the mating region either after the material comprising the mating and non-mating region of the shaft, as shown, before the material comprising the mating and non-mating region of the shaft, or can be interspersed or interleaved with layers of material comprising the mating and non-mating region of the shaft. Further, curing of the various layers of material can be completed all at once, in stages including any combination of the layers, or by performing a cure step subsequent to the application of each additional layer.

A tubular sleeve 140 is provided, and the assembly of shaft 110 and fitting 120 are inserted through a lumen 142 defined by sleeve 140. Sleeve 140 can be applied from the shaft side, as shown, or from the fitting side of the member. In some cases, sleeve 140 is slightly tapered, as are the coupling region 122 and mating region 114. Either the entire sleeve 140 can be tapered, or only the inner surface 141 of sleeve 140 may be tapered and substantially parallel with the outer surface 118 of the shaft 110. This allows the sleeve 140 to slide onto shaft 110 and come into increasingly close contact with the shaft and/or fitting, i.e., there is increasing interference between the shaft 110 and the sleeve 140 as the sleeve 140 slides further onto shaft 110. Fitting may include a shoulder 126 (FIG. 2) for impeding the sleeve 140 as it slides onto shaft 110. This provides a physical manner of accurately locating the position of the sleeve 140 relative to the shaft 110. A section of reduced diameter 144 (FIG. 2) can be included in sleeve 140 to assure proper contacting of sleeve 140 and shoulder 126. The applied sleeve 140 is substantially concentric with shaft 110 and radially adjacent to mating region 114. This further serves to prevent radial expansion or deformation of shaft 110. Sleeve 140 may be formed of a range of materials, including metals and composites. In some embodiments, no sleeve is applied, and instead more material is applied to the mating region of the shaft.

Other methods for attaching the sleeve are also possible. For example, sleeve 140 can be press fit around shaft 110, fitting 120, or both. This can be done at one or several discrete locations, or can be a compressing of the entire sleeve 140. In other embodiments, adhesive is applied to one or both of sleeve 140 and shaft 110. This can be done to enhance the bonding between sleeve 140 and the other components, or can be done in place of press-fitting, in order to secure sleeve 140 in place. The application of adhesive is facilitated by the use of a tapered sleeve and coupling region of fitting, as described above, as this geometry allows the parts to gradually engage as the shaft is inserted through the sleeve.

Referring to FIGS. 6 and 7, in another embodiment of the present invention, a composite structural member 200 includes a shaft 210 and a fitting 220, the fitting defining a depression 224. Depression 224 does not extend completely around the circumference of fitting 220, that is, the depression 224 is not radially symmetric so as to form a neck. Using the processes described above, the shaft 210 can be formed around fitting 220 such that the shaft 210 assumes the profile of the fitting 220 with a portion of the shaft protruding into and engaging the depression. Because the depression 224 is not radially symmetric, the mechanical interference its presence causes between shaft 210 and fitting 220 inhibits both relative translation of the shaft 210 and fitting 220 as well as relative rotation. Along the lines of the embodiment illustrated in FIGS. 6 and 7, it should be noted that the recessed portions in all of the examples could also be protrusions 234 as shown in FIG. 8 that act to similarly induce mechanical interference with the fitting 230 and associated shaft. Although the embodiment depicted in FIGS. 6 and 7 have a single depression, the fitting can include two or more depressions and/or protrusions spaced circumferentially thereabout.

Many modifications and other embodiments of the invention will come to mind to one skilled in the art to which this invention pertains having the benefit of the teachings presented in the foregoing descriptions and the associated drawings. For example, referring to FIG. 9, in one embodiment of the process for creating a composite structural member 300, a core structure 360 is disposed within the fitting in the general area where the shaft will later be formed. The core structure acts as a template, along with the fitting, around which the shaft is formed. In this way, the core 360 permanently forms part of the composite member 300, being disposed in the lumen 312 formed by the shaft 110. Core material, for example, can be a polymeric structural foam, such that its crush strength is sufficient to support the shaft during processing and/or use, while the weight added by the presence of the core is minimal.

The present invention also contemplates embodiments in which the fitting is not an end fitting, but rather is more centrally located in the shaft. Also, when used in conjunction with the sleeve, reinforcing member can be any structure that couples the outer surface of the shaft in the area of the neck with the inner surface of the sleeve, such that the reinforcing member creates a mechanical stop for radial expansion of the shaft. Other processes are also available for forming the shaft, such as resin transfer molding of dry fiber pre-forms. In some embodiments, some or all of the coupling region of the fitting is radially asymmetrical so as to physically discourage relative rotation of the fitting and shaft. For example, the coupling region could be rectangular or elliptical in cross section.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for producing a composite structural member, the method comprising:
   providing a metallic fitting having a coupling region and an outwardly extending shoulder, the coupling region defining at least one recessed portion bounded by one or more non-recessed portions;
   forming a tubular shaft around said fitting such that a mating region of said shaft has a stiffness greater than another region of the shaft and defines a lumen, said tubular shaft formed around said fitting such that the fitting is disposed in the lumen such that the mating region mates with the coupling region of said fitting, said tubular shaft including both the mating region and the another region being formed of a common fiber-reinforced material with the mating region including fibers that are provided such that the mating region has increased stiffness for radial expansion relative to the another region of said shaft; and
   coupling a sleeve coupled to said shaft for discouraging expansion of the mating region of said shaft, said sleeve comprising first and second portions with the first portion having smaller internal dimensions than the second portion to thereby define a shoulder extending outwardly from the first portion to the second portion, said sleeve positioned relative to the fitting such that the shoulder of the sleeve abuts the shoulder of the fitting as a result of the internal dimensions of the first portion of the sleeve being smaller than outer dimensions of the shoulder of the fitting with the fitting extending into the second portion and impeding movement of the first portion over the shoulder of the fitting,
   wherein said shaft and fitting are mechanically restrained from at least some relative movement due to interference of said shaft and said fitting.

2. A method according to claim 1, wherein forming the tubular shaft comprises forming the mating region to include an increased percentage of fibers oriented substantially circumferentially relative to the another region of said shaft.

3. A method according to claim 1, wherein coupling the sleeve comprises applying the sleeve around said shaft such that said sleeve is substantially concentric with said shaft and radially adjacent to at least part of the mating region.

4. A method according to claim 1, wherein coupling said sleeve to said shaft comprises inserting said shaft and fitting through the lumen defined by said sleeve until said sleeve contacts the shoulder of said fitting.

5. A method according to claim 1, wherein the coupling region of said fitting and said sleeve are tapered and further comprising applying adhesive to at least one of said fitting and said sleeve.

6. A method according to claim 1, wherein forming said shaft comprises forming said shaft by one of the group consisting of: resin transfer molding and laying up of one or more sheets of dry fibers.

7. A method according to claim 1, further comprising inserting a core structure into a fitting, and wherein the forming the shaft includes forming around fitting and core structure.

8. A method according to claim 7, further comprising removing the core structure subsequent to forming the shaft.

9. A method according to claim 1, wherein the recessed portion extends circumferentially around said fitting to form a neck.

10. A method according to claim 1, wherein an inner surface of said sleeve is substantially parallel with an outer surface of said shaft.

11. A method comprising:
    providing a metallic fitting including a coupling region and an outwardly extending shoulder, the coupling region defining at least one of a protrusion or a recessed portion bounded by one or more non-recessed portions;
    providing a tubular shaft having a mating region and defining a lumen, said shaft including the mating region being comprised of a common material including reinforcing fibers and being configured to have a greater percentage of substantially circumferential fibers in the mating region than in another region of said shaft, such that the mating region has increased stiffness for radial expansion relative to the another region of said shaft;
    disposing said fitting in the lumen of said shaft such that the mating region of said shaft mates with the coupling region of said fitting and said shaft and fitting are mechanically restrained from at least some relative movement due to interference of said shaft and said fitting; and
    coupling a sleeve to said shaft for discouraging expansion of the mating region of said shaft, said sleeve comprising first and second portions with the first portion having smaller internal dimensions than the second portion to thereby define a shoulder extending outwardly from the first portion to the second portion, said sleeve positioned relative to the fitting such that the shoulder of the sleeve abuts the shoulder of the fitting as a result of the internal dimensions of the first portion of the sleeve being smaller than outer dimensions of the shoulder of the fitting with the fitting extending into the second portion and impeding movement of the first portion over the shoulder of the fitting.

12. A method according to claim 11, wherein the coupling region is radially asymmetrical.

13. A method according to claim 11, wherein said sleeve is formed of a metallic material.

14. A method according to claim 11, wherein coupling the sleeve comprises applying the sleeve around said shaft such that said sleeve is substantially concentric with said shaft and radially adjacent to at least part of the mating region.

15. A method according to claim 11, wherein coupling said sleeve to said shaft comprises inserting said shaft and fitting through the lumen defined by said sleeve until said sleeve contacts the shoulder of said fitting.

16. A method according to claim 11, wherein the coupling region of said fitting and said sleeve are tapered and further comprising applying adhesive to at least one of said fitting and said sleeve.

17. A method according to claim 11, wherein providing the shaft comprises forming said shaft by one of the group consisting of: resin transfer molding and laying up of one or more sheets of dry fibers.

18. A method according to claim 11, further comprising inserting a core structure into the fitting, and wherein providing the shaft includes forming around fitting and core structure.

19. A method according to claim 17, further comprising removing the core structure subsequent to forming the shaft.

20. A method according to claim 11, wherein the recessed portion extends circumferentially around said fitting to form a neck.

21. A method according to claim 11, wherein an inner surface of said sleeve is substantially parallel with an outer surface of said shaft.

\* \* \* \* \*